UNITED STATES PATENT OFFICE.

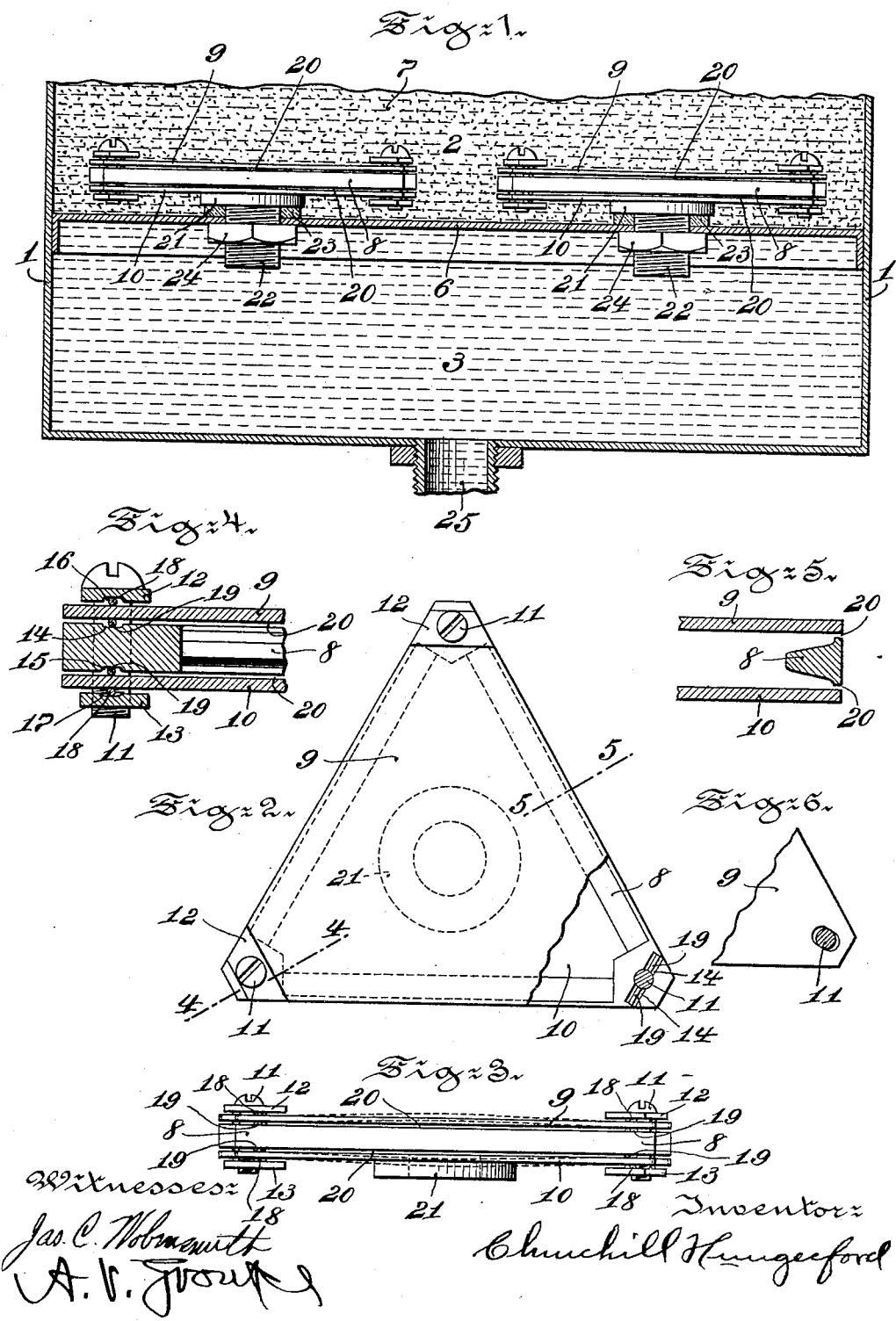

CHURCHILL HUNGERFORD, OF PHILADELPHIA, PENNSYLVANIA, ASSIGNOR TO THE HUNGERFORD FILTER CORPORATION, OF JERSEY CITY, NEW JERSEY, A CORPORATION OF NEW JERSEY.

FILTER-VALVE.

No. 814,136.  Specification of Letters Patent.  Patented March 6, 1906.

Application filed December 14, 1905. Serial No. 291,678.

*To all whom it may concern:*

Be it known that I, CHURCHILL HUNGERFORD, a citizen of the United States, residing in the city and county of Philadelphia, in the State of Pennsylvania, have invented certain new and useful Improvements in Filter-Valves, of which the following is a full, clear, and exact description.

The object of my invention, as generally stated, is to provide a simple and efficient construction of filter-valve whereby the ports thereof through which the water passes will be automatically increased in area during the passage of water therethrough in one direction during the cleaning of the filter and which ports will be automatically decreased in area upon the reversal of the flow of water for filtering purposes.

The invention consists in the novel construction and combinations of parts, which will be hereinafter fully described and claimed.

In the drawings, Figure 1 is a vertical section of a portion of a filter provided with valves embodying my invention. Fig. 2 is a top view, partly broken away, of my improved valve. Fig. 3 is an elevation of the valve, showing by dotted lines the position the plates thereof assume during the operation of cleaning the filter. Fig. 4 is a sectional detail, enlarged, as on the line 4 4 of Fig. 2. Fig. 5 is a similar detail, as on the line 5 5 of Fig. 2. Fig. 6 is a detail of a portion of one of the angular plates.

1 designates the lower portion of a filter-tank which is divided into two compartments 2 and 3 by a partition 6, the upper compartment 2 containing the sand 7 or other filtering medium.

Mounted on the partition 6 are my improved valves, each of which is of the following construction: 8 designates an angular frame-like casing. In the present embodiment of my invention this casing is made in the form of a triangle, or substantially so. Arranged adjacent to the upper and lower faces of this casing are triangular plates 9 and 10, respectively, the edges of which extend to the edge of the frame 8. Extending through each corner of the frame 8 and plates 9 and 10 is a screw 11, the head on the upper end of which engages a small plate 12 above the plate 9 and the lower end of which is screwed into a similar small plate 13 below the plate 10. The upper and lower faces of the frame 8 near each corner thereof and adjacent to the screw 11 are provided with depressions or grooves 14 and 15, and the lower faces of the upper plates 12 and the upper faces of the lower plates 13 are provided with similar opposing grooves 16 and 17, respectively. Arranged within the grooves 16 and 17 and interposed between the plates 12 and the plate 9 and between the plates 13 and the plate 10 are rollers 18, respectively, and arranged within the grooves 14 and 15 and interposed between the plate 9 and the top of the casing 8 and between the plate 10 and the bottom of the casing 8 are rollers 19, parallel to the rollers 18. The rollers 19 serve to maintain the plates 9 and 10 a slight distance from the upper and lower faces of the frame 8, thus providing along each side of the triangle long narrow ports 20. The rollers 18 serve to prevent the corners of the plates 9 and 10 from moving away from the casing 8. The length of the openings in the plates 9 and 10, through which the screws 11 extend, is greater than the diameter of the screws 11, to the end that the roller-engaged portions of the plates 9 and 10 may move toward and from each other to permit the central body portion of the plates to move toward and away from the casing 8 to decrease and increase the area of the ports 20, during which movement of the plates 9 and 10 the rollers 18 and 19 serve to decrease the friction between the coacting parts.

The lower plate 10 is provided with a central opening, and surrounding this opening and secured to the plate 10 is a flange 21 on the upper end of a short pipe 22, which extends down through an opening in the partition 6 to afford communication between the compartment 3 and the interior of the valve-casing. The flange 21 rests upon a washer 23, which in turn rests upon the partition 6, and screwed on the lower end of the pipe 22 and against the partition 6 is a nut 24, by means of which the valve is firmly secured to the partition.

The operation of the valve is as follows: During the filtering operation the water to be filtered passes down through the sand 7 into the valves through the ports 20 and out of the valves into the compartment 3, from which it passes, by way of an opening 25 in the bottom thereof, to the user. During the cleaning operation the flow of water is reversed—that is, the water passes up through the compartments 3 and 2 to agitate the sand 7 and carry off the particles of dirt deposited thereon during the filtering operation. In order to agitate the sand and facilitate the cleaning operation, it is necessary that during this operation a larger volume of water pass through the filter and at a greater velocity than during the filtering operation. It is therefore necessary that the area of the valve-ports be increased during the cleaning operation and decreased during the filtering operation. A wide range of automatic variation in area of the ports 20 during the filtering and cleaning operations is accomplished by my improved valve. Normally the opposing edges of the plates 9 and 10 and casing 8 are parallel to each other, excepting the edge of the upper plate, which is bowed downwardly or inwardly by the weight of sand thereon. In this position the ports 20 are sufficiently narrow to prevent any sand grains from entering the valves with the filtered water. When, however, the flow of water is reversed and it passes out through the ports 20 at a greater velocity, the corners of the plates 9 and 10 engaged by the rollers will move toward each other, and the edges of the plates will bow outwardly away from the casing, due to the pressure of the water passing through the valve, and thus automatically increase the area of the ports 20. After the filter has been cleaned the plates, being made of spring metal, will automatically spring back to normal position, and the filtering operation may be again repeated.

I claim—

1. In a filter-valve, a casing, a plate arranged adjacent to the casing to provide a port between the wall of the casing and the plate and means to engage said plate at two separate points to prevent movement of the plate away from the casing at said points and yet permit the engaged portions of the plate to move toward and from each other, whereby that portion of the plate between the engaged portions thereof is permitted to move toward and from the casing to increase and decrease the area of said port, substantially as set forth.

2. In a filter-valve, a casing, an angular plate arranged adjacent to the casing to provide a port between the wall of the casing and the plate and means to engage said plate adjacent to the corners thereof to prevent movement of said corners away from the casing and yet permit them to move toward and from each other, whereby portions of the plate between the corners thereof are permitted to move toward and from the casing to increase and decrease the area of said port, substantially as set forth.

3. In a filter-valve, a casing, a plate arranged adjacent to the casing to provide a port between the wall of the casing and the plate, means to prevent movement of the plate away from the casing at two separate points, and rollers interposed between said casing and plate and said plate and said means at said points, whereby the roller-engaged portions of the plate may move toward and from each other and the intermediate portion of the plate may move toward and away from the casing to increase and decrease the area of said port, substantially as set forth.

4. In a filter-valve, a casing, an angular plate arranged adjacent to the casing to provide a port between the wall of the casing and the plate, means adjacent to the corners of the plate to prevent movement of said corners away from the casing, and rollers interposed between said casing and plate and said plate and said means, whereby the roller-engaged portions of the plate may move toward and from each other and the intermediate portion of the plate may move toward and from the casing to increase and decrease the area of said port, substantially as set forth.

In testimony whereof I have hereunto affixed my signature.

CHURCHILL HUNGERFORD.

Witnesses:
JAS. C. WOBERSMITH,
A. V. GROUPE.